(12) United States Patent
Yoshikawa

(10) Patent No.: US 10,527,840 B2
(45) Date of Patent: Jan. 7, 2020

(54) LIGHT CONVERSION DEVICE AND PROJECTION DISPLAY APPARATUS INCLUDING SAME

(71) Applicant: Panasonic Intellectual Property Management Co., Ltd., Osaka (JP)

(72) Inventor: Tsutomu Yoshikawa, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/817,336

(22) Filed: Nov. 20, 2017

(65) Prior Publication Data

US 2018/0088317 A1 Mar. 29, 2018

Related U.S. Application Data

(63) Continuation of application No. PCT/JP2016/005024, filed on Nov. 30, 2016.

(30) Foreign Application Priority Data

Dec. 10, 2015 (JP) .................................. 2015-241359

(51) Int. Cl.
*G02B 26/00* (2006.01)
*G02B 5/20* (2006.01)
(Continued)

(52) U.S. Cl.
CPC .............. *G02B 26/008* (2013.01); *G02B 5/20* (2013.01); *G03B 21/16* (2013.01); *H04N 9/3141* (2013.01)

(58) Field of Classification Search
CPC .... G03B 21/204; G03B 21/16; G02B 26/008; H04N 9/3144; H04N 9/3111;
(Continued)

(56) References Cited

U.S. PATENT DOCUMENTS 8,622,591 B1 * 1/2014 Liu ..................... F21V 29/40
362/249.02
2002/0003704 A1 1/2002 Ohmae et al.
(Continued)

FOREIGN PATENT DOCUMENTS

JP 49-058447 6/1974
JP 62-029554 U 2/1987
(Continued)

OTHER PUBLICATIONS

International Search Report of PCT application No. PCT/JP2016/005024 dated Feb. 21, 2017.

*Primary Examiner* — Cara E Rakowski
*Assistant Examiner* — Christopher A Lamb, II
(74) *Attorney, Agent, or Firm* — Wenderoth, Lind & Ponack, L.L.P.

(57) ABSTRACT

A light conversion device includes a phosphor wheel, a circulation fan, a motor, a casing unit, and a heat absorber. The phosphor wheel has a first side on which a phosphor layer is formed. The circulation fan blows an air flow to the phosphor layer. The motor rotatably drives the phosphor wheel. The casing unit houses the phosphor wheel, the circulation fan, and the motor. In the casing unit, a circulation path of the air flow created by the circulation fan is formed. The heat absorber is in the shape of a cylinder. The heat absorber includes a fin structure including a plurality of fins arranged along a radial direction of the casing unit and provided so as to extend in a height direction of the cylinder. The air flow is supplied to the heat absorber to cool the air flow that has absorbed heat generated at the phosphor layer.

20 Claims, 15 Drawing Sheets

(51) Int. Cl.
*G03B 21/16* (2006.01)
*H04N 9/31* (2006.01)

(58) Field of Classification Search
CPC ... H04N 9/3114; H04N 9/3117; F21S 10/007; F04D 29/4226
See application file for complete search history.

(56) References Cited

U.S. PATENT DOCUMENTS

| | | | |
|---|---|---|---|
| 2003/0095349 A1 | 5/2003 | Inamoto | |
| 2004/0095767 A1 | 5/2004 | Ohmae et al. | |
| 2004/0107584 A1 | 6/2004 | Yoshida et al. | |
| 2005/0019165 A1* | 1/2005 | Fujimori | F04D 29/327 416/223 R |
| 2005/0163614 A1* | 7/2005 | Chapman | F04D 29/30 415/206 |
| 2012/0013854 A1 | 1/2012 | Nishimura et al. | |
| 2012/0162993 A1* | 6/2012 | Cheng | F21S 10/02 362/284 |
| 2012/0229780 A1 | 9/2012 | Sato | |
| 2013/0169938 A1 | 7/2013 | Huang et al. | |
| 2014/0139812 A1 | 5/2014 | Nagatani | |
| 2015/0029472 A1 | 1/2015 | Lin et al. | |
| 2015/0131062 A1 | 5/2015 | Nishimori et al. | |
| 2016/0069558 A1* | 3/2016 | Hu | G02F 1/1336 362/84 |
| 2016/0077326 A1 | 3/2016 | Yamagishi et al. | |
| 2016/0291449 A1* | 10/2016 | Masuda | G03B 21/16 |

FOREIGN PATENT DOCUMENTS

| | | |
|---|---|---|
| JP | 63-030816 | 2/1988 |
| JP | 6-080027 | 3/1994 |
| JP | 2002-090886 | 3/2002 |
| JP | 2003-156796 | 5/2003 |
| JP | 2005-103912 | 4/2005 |
| JP | 2007-078275 | 3/2007 |
| JP | 2012-181431 | 9/2012 |
| JP | 2012-185369 | 9/2012 |
| JP | 2013-250422 | 12/2013 |
| JP | 2014-092599 | 5/2014 |
| JP | 2014-102312 | 6/2014 |
| JP | 2015-094860 | 5/2015 |
| JP | 2016-053608 | 4/2016 |
| JP | 2016-066061 | 4/2016 |
| JP | 2016-163183 | 9/2016 |
| WO | 2010/116444 | 10/2010 |
| WO | 2014/173234 | 10/2014 |
| WO | 2016/121028 | 8/2016 |
| WO | 2016/170969 | 10/2016 |
| WO | 2017/064866 | 4/2017 |

* cited by examiner

LIGHT CONVERSION DEVICE AND PROJECTION DISPLAY APPARATUS INCLUDING SAME

BACKGROUND

Technical Field

The present disclosure relates to a light conversion device and a projection display apparatus including the light conversion device.

Description of the Related Art

Known projection display apparatuses include a device in which a laser diode is used as a light source, a phosphor is excited by light emitted from the laser diode, and light produced by fluorescence from the phosphor is used. It is, however, necessary to reduce a rise in temperature because of the temperature characteristics of the phosphor itself based on the light conversion efficiency thereof and the heat-resistance of binder or the like for forming the phosphor on a substrate.

Thus, a phosphor layer is formed on a disc-shaped substrate which is then attached to a motor and rotated so that a part which emits light by fluorescence is constantly moved to reduce the rise in temperature. There is, however, the risk that dust is included in excitation light and burned on the surface of the phosphor, causing a reduction in the efficiency.

Therefore, it is common to dispose the phosphor in a sealed space for protection from dust and also enclose a cooling fan in the same space for the purpose of cooling, as in Unexamined Japanese Patent Publication No. 2014-092599.

In this regard, a device including a shared power source having the same axis as the disc-shaped substrate, other than a commonly used cooling fan, is also known as in Unexamined Japanese Patent Publication No. 2012-181431.

Meanwhile, the exited light has been increasing with higher luminance of projection display apparatuses, resulting in the cooling performance becoming insufficient. Moreover, when the motor is disposed in the sealed space, the temperature of the motor increases, causing the problem of being unable to exhibit the intrinsic performance thereof.

Thus, there is another approach in which a part of the motor is exposed outside the sealed space as in Unexamined Japanese Patent Publication No. 2015-094860.

The conventional light conversion devices, however, have the following problems. Specifically, in the light conversion devices disclosed in the above-mentioned literatures, when an optical lens for exciting the phosphor is disposed close to the phosphor layer, it may not be possible to sufficiently blow air to and around the phosphor layer, resulting in a failure to sufficiently dissipate heat generated at the phosphor.

SUMMARY OF THE INVENTION

SUMMARY

A light conversion device according to the present disclosure includes a phosphor wheel, a circulation fan, a motor, a casing unit, and a heat absorber. The phosphor wheel has a first side on which a phosphor layer in the shape of a ring is formed, and is in the shape of a disc with an opening provided on a side of an inner periphery of the phosphor layer. The circulation fan blows an air flow to the phosphor layer on the phosphor wheel. The motor rotatably drives the phosphor wheel. The casing unit houses the phosphor wheel, the circulation fan, and the motor. In the casing unit, a circulation path of the air flow created by the circulation fan is formed. The heat absorber is in the shape of a cylinder. The heat absorber includes a fin structure including a plurality of fins arranged along a radial direction of the casing unit and provided so as to extend in a height direction of the cylinder. The air flow created by the circulation fan is supplied to the heat absorber from the center of the cylinder to cool the air flow that has absorbed heat generated at and around the phosphor layer on the phosphor wheel. The plurality of fins are arranged on an end surface of the casing unit in plan view.

The light conversion device according to the present disclosure is effective in improving the cooling efficiency for the phosphor layer to improve the conversion efficiency.

DETAILED DESCRIPTION

Hereinafter, exemplary embodiments will be described in detail with reference to the drawings as necessary. However, there are instances where overly detailed description is omitted. For example, detailed description of well-known matter, overlapping description of substantially identical elements, etc., may be omitted. This is to prevent the subsequent description from becoming unnecessarily redundant, and thus facilitate understanding by a person having ordinary skill in the art.

Note that the accompanying drawings and the subsequent description are provided so that a person having ordinary skill in the art is able to sufficiently understand the present disclosure, and are not intended to limit the scope of the subject matter recited in the claims.

First Exemplary Embodiment

With reference to FIG. 1 to FIG. 9, a phosphor wheel device according to one exemplary embodiment of the present disclosure and a light conversion device and a projection display apparatus which include the phosphor wheel device are described as follows.

Projector 100

Projector (projection display apparatus) 100 according to the present exemplary embodiment is a digital light processing (DLP) video display apparatus including a single spatial light modulation element (such as a digital mirror device (DMD) (light valve) 7) which modulates light according to a video signal, and includes blue laser diode (LD) arrays (light sources) 2a and 2b, various optical components, and light conversion device 20 including phosphor wheel device 10 which emits fluorescence excited by laser light.

Figure 1:
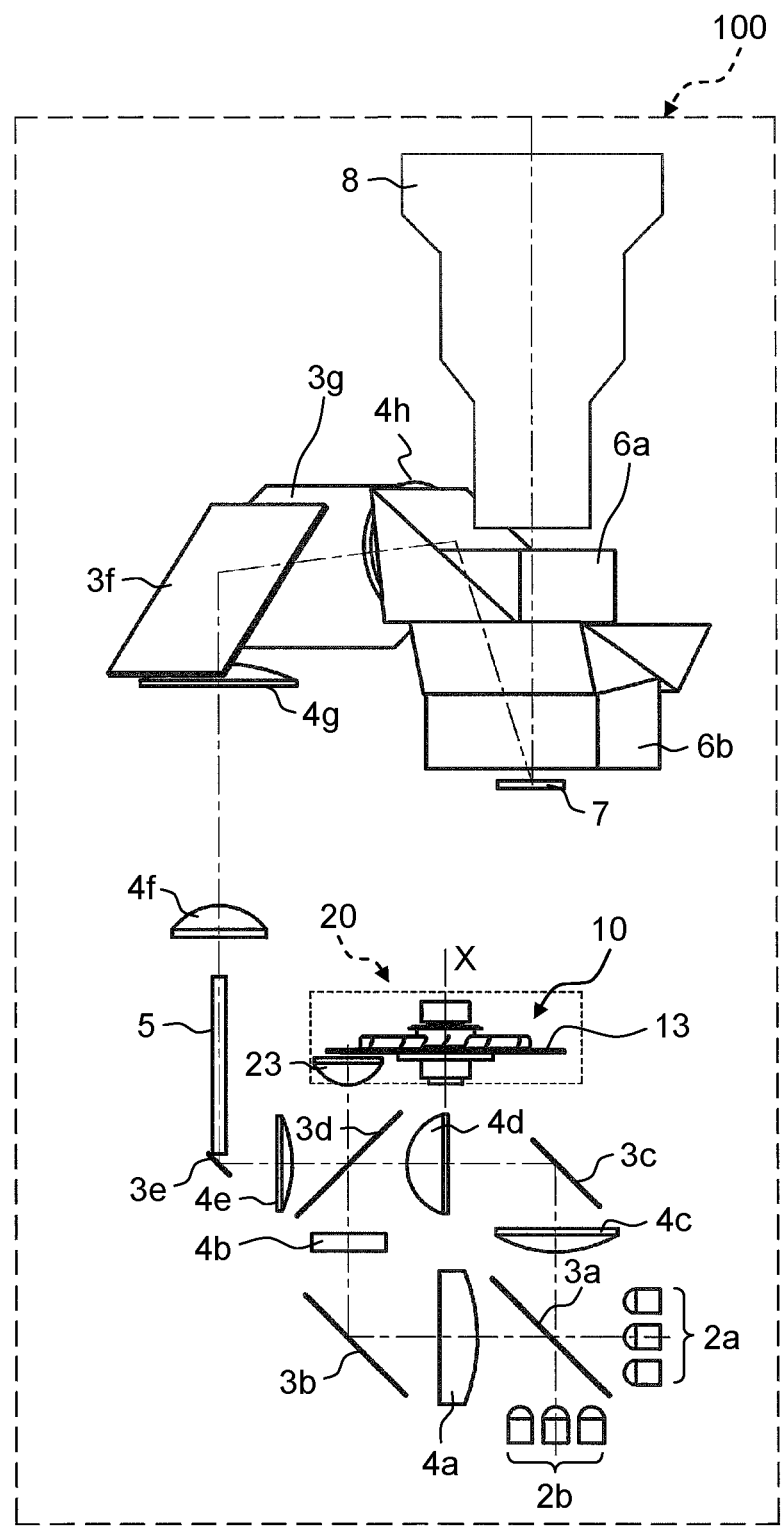
FIG. 1 schematically illustrates a projection display apparatus according to the first exemplary embodiment of the present disclosure.

Note that projector 100 according to the present exemplary embodiment uses the three-chip DLP technology in which three DMDs 7 corresponding to the three primary RGB colors are mounted, but only one DMD 7 is illustrated in FIG. 1 for convenience of description.

As illustrated in FIG. 1, projector 100 according to the present exemplary embodiment includes: two blue LD arrays 2a and 2b as light sources; separation mirror 3a, mirrors 3b and 3c, dichroic mirror 3d, mirrors 3e, 3f, and 3g, lenses 4a to 4h, rod integrator 5, total internal reflection (TIR) prism 6a, color prism 6b, DMD 7, and projection lens 8 as optical components; and light conversion device 20.

Blue LD arrays 2a and 2b which are light sources of projector 100 are configured to include a plurality of LDs both in the vertical and horizontal directions (m×n LDs) and are arranged in orthogonal directions. Thus, light emitted from blue LD array 2a and light emitted from blue LD array 2b travel in orthogonal directions.

Separation mirror 3a is provided around the point of intersection between beams of laser light emitted from two blue LD arrays 2a and 2b and separates the laser light emitted from each of blue LD arrays 2a and 2b into beams traveling in two directions.

Mirrors 3b and 3c respectively converts, at 90 degrees, the two directions of travel of the laser light separated by separation mirror 3a.

Dichroic mirror 3d is configured using a special optical material and reflects light at a specific wavelength and transmits light at the other wavelengths. In the present exemplary embodiment, dichroic mirror 3d transmits the blue laser light emitted from blue LD arrays 2a and 2b and reflects red light and green light resulting from conversion of the blue laser light in phosphor wheel device 10 to be described later.

Mirrors 3e, 3f, and 3g guides, to projection lens 8 disposed at the most downstream location, the light of the three primary RGB colors transmitted or reflected by dichroic mirror 3d.

Lenses 4a to 4h converge or parallelize the blue laser light emitted from blue LD arrays 2a and 2b serving as the light sources and the red light or the green light resulting from conversion of the blue laser light in phosphor wheel device 10.

Rod integrator 5 equalizes the illuminance of incident light. Light incident on rod integrator 5 is repeatedly totally reflected by the inner peripheral surface of rod integrator 5 and emitted from an emitting surface thereof as light having a uniform illuminance distribution. Rod integrator 5 is positioned so that the light reflected by mirror 3e enters rod integrator 5.

Total internal reflection (TIR) prism 6a converts the direction of travel of incident light by total reflection.

Color prism 6b separates incident light into beams of three primary RGB colors and reflects the beams to three DMDs 7 disposed downstream and corresponding to these colors.

Three DMDs 7 are provided so as to correspond one-to-one with the three primary RGB colors. Each DMD 7 modulates incident light using a video signal and emits the modulated light to projection lens 8 by way of color prism 6b and TIR prism 6a.

Projection lens 8 is disposed at the most downstream location among the optical components mounted in projector 100 and projects, to a screen not illustrated in the drawings, light entering projection lens 8 by way of TIR prism 6a, DMD 7, and color prism 6b, as an enlarged view.

Light conversion device 20 converts blue light emitted from blue LD arrays 2a and 2b to be described later, into red light and green light by phosphors, and includes phosphor wheel device 10. Note that the configuration of light conversion device 20 including phosphor wheel device 10 will be described in detail later.

Projection of Images Using Projector 100

The laser light emitted from two blue LD arrays 2a and 2b is divided into beams traveling in two directions by separation mirror 3a disposed around the point of intersection between the two beams of laser light.

Among the two beams of laser light, first blue laser light passes through dichroic mirror 3d by way of lens 4c, mirror 3c, and lens 4d. Thereafter, the first blue laser light passes through lens 4e and then is reflected off mirror 3e 90 degrees, entering rod integrator 5.

Second blue laser light passes through dichroic mirror 3d by way of lens 4a, mirror 3b, and lens 4b, and illuminates phosphor layer 13a on phosphor wheel 13 in phosphor wheel device 10. At this time, the second blue laser light is converted into red light and green light by exciting a red phosphor and a green phosphor in phosphor layer 13a.

At this time, phosphor wheel 13 is rotatably driven by motor 14, and thus it is possible to prevent burning when the red phosphor and the green phosphor are irradiated with the blue laser light.

The red light and the green light resulting from the conversion are reflected off dichroic mirror 3d at 90 degrees, entering rod integrator 5.

The beams of laser light of the three primary RGB colors are mixed in rod integrator 5 and then enter a boundary layer of TIR prism 6a by way of lens 4f and mirrors 3f and 3g. Since the incident light forms total reflection angle with the boundary surface of TIR prism 6a, the beams of laser light of the three primary RGB colors travel toward color prism 6b as a result of the reflection.

In color prism 6b, the light is separated into beams of the three primary RGB colors which then respectively enter corresponding three DMDs 7.

Light rays reflected after forming an image in DMD 7 are combined by color prism 6b and enter projection lens 8 through the boundary layer of TIR prism 6a to project images on a projection screen.

In projector 100 according to the present exemplary embodiment, the blue laser light emitted from blue LD arrays 2a and 2b serving as excitation light sources excites the red phosphor and the green phosphor contained in phosphor layer 13a provided on a surface of phosphor wheel 13 to produce red light and green light. At this time, not the entire energy of the blue laser light is converted to fluorescence, but part of the energy of the blue laser light is converted to thermal energy, which leads to an undesirable increase in temperature of the red phosphor and the green phosphor.

Here, an increase in temperature of phosphors may cause a reduction in the light conversion efficiency or may cause heat discoloration, etc., of binder for securing the phosphors onto phosphor wheel 13. Therefore, phosphor wheel 13 is rotatably driven by motor 14 to suppress the increase in temperature of the phosphors.

However, since the intensity of exited light increases along with an increase in luminance of projector 100 and thus the cooling performance for phosphor portions provided by only rotating phosphor wheel 13 is not sufficient, it is necessary to actively cool the phosphors by blowing cool air on the phosphor portions.

Figure 5:
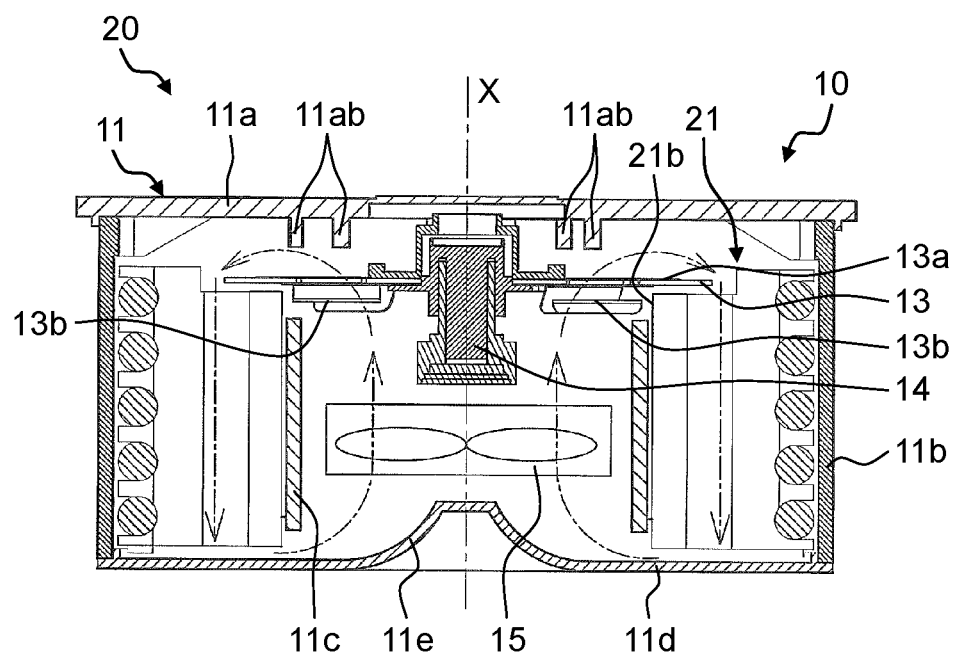
FIG. 5 is a cross-sectional view illustrating the inner configuration of the light conversion device in FIG. 2.

Therefore, in the present exemplary embodiment, as illustrated in FIG. 5, phosphor layer 13a is provided on a first side of phosphor wheel 13, and circulation fan 13b for blowing cooling air to phosphor layer 13a is provided on a second side of phosphor wheel 13 opposite the first side.

Note that the configuration of phosphor wheel device 10 and light conversion device 20 including phosphor wheel device 10 will be described in detail later.

Configuration of Light Conversion Device 20

Figure 2:
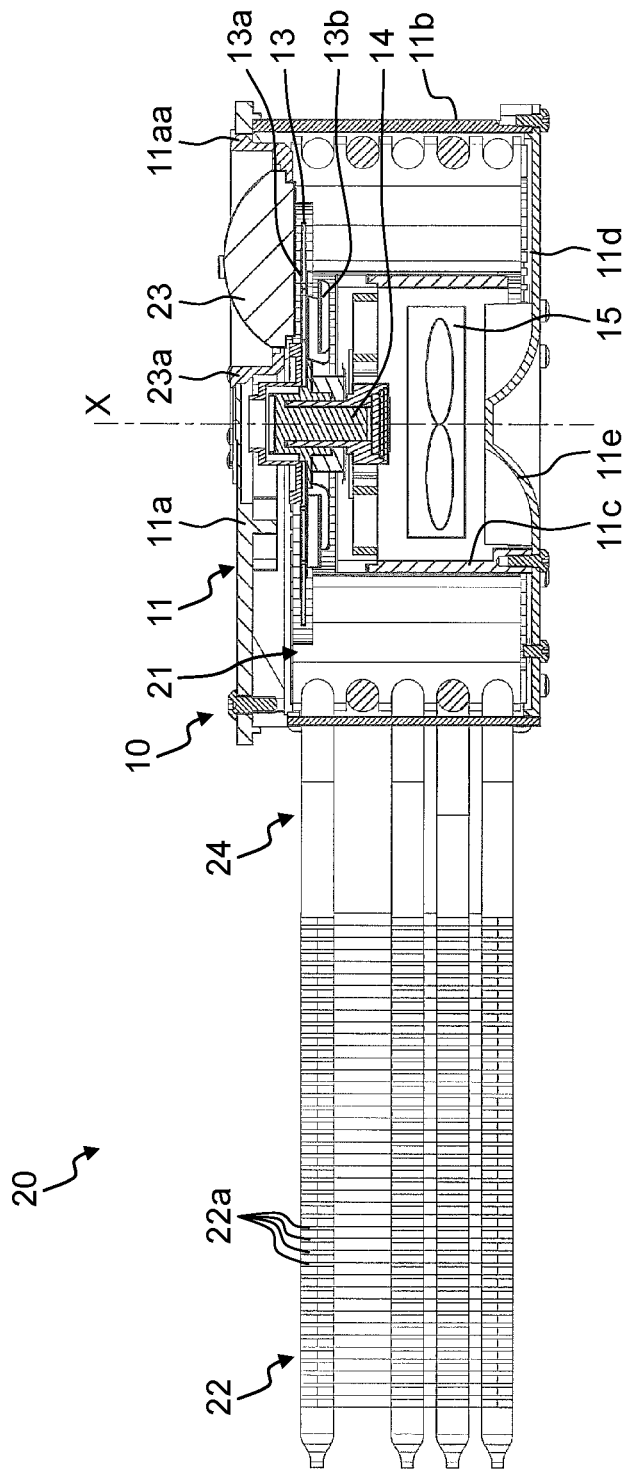
FIG. 2 illustrates the configuration of a main portion of a light conversion device included in the projection display apparatus in FIG. 1.

As illustrated in FIG. 2, light conversion device 20 according to the present exemplary embodiment includes phosphor wheel device 10 to be described later, heat absorber 21, heat dissipator 22, optical lens 23, and heat pipe 24.

In light conversion device 20, phosphor wheel device 10 converts incident blue laser light into red light and green light by irradiating phosphors with the incident blue laser light. Note that the configuration of phosphor wheel device 10 will be described in detail later.

Figure 3:
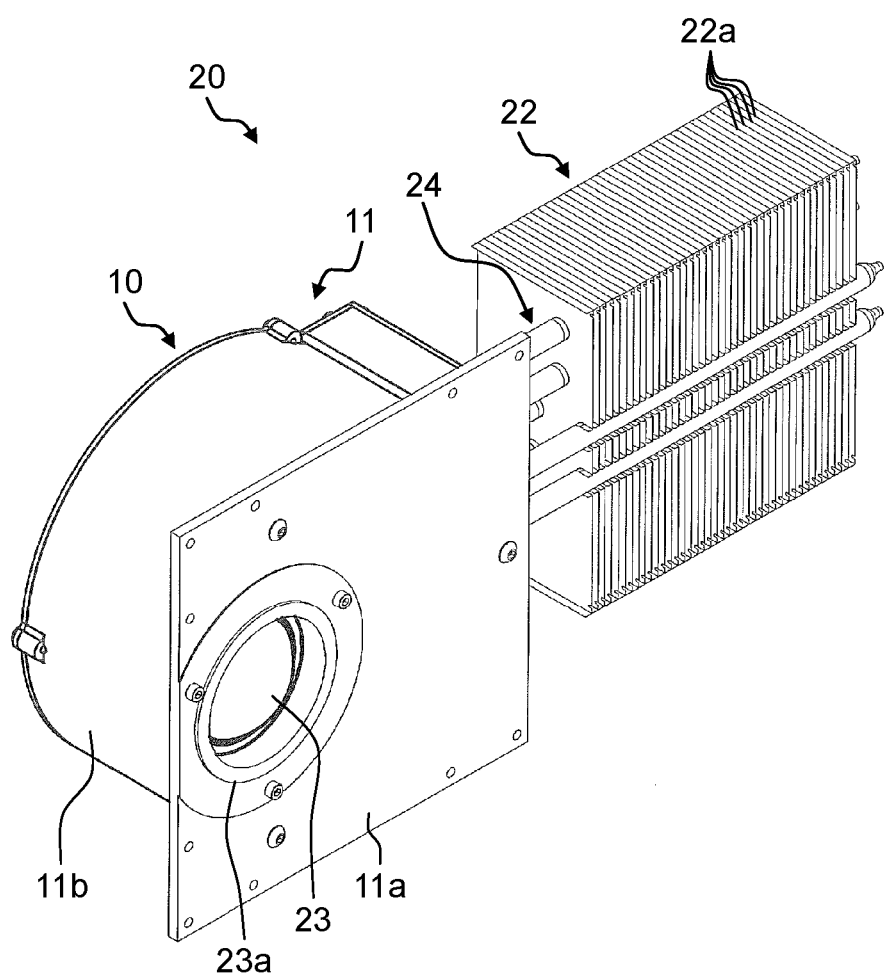
FIG. 3 is an external perspective view of the light conversion device in FIG. 2.
Figure 4A:
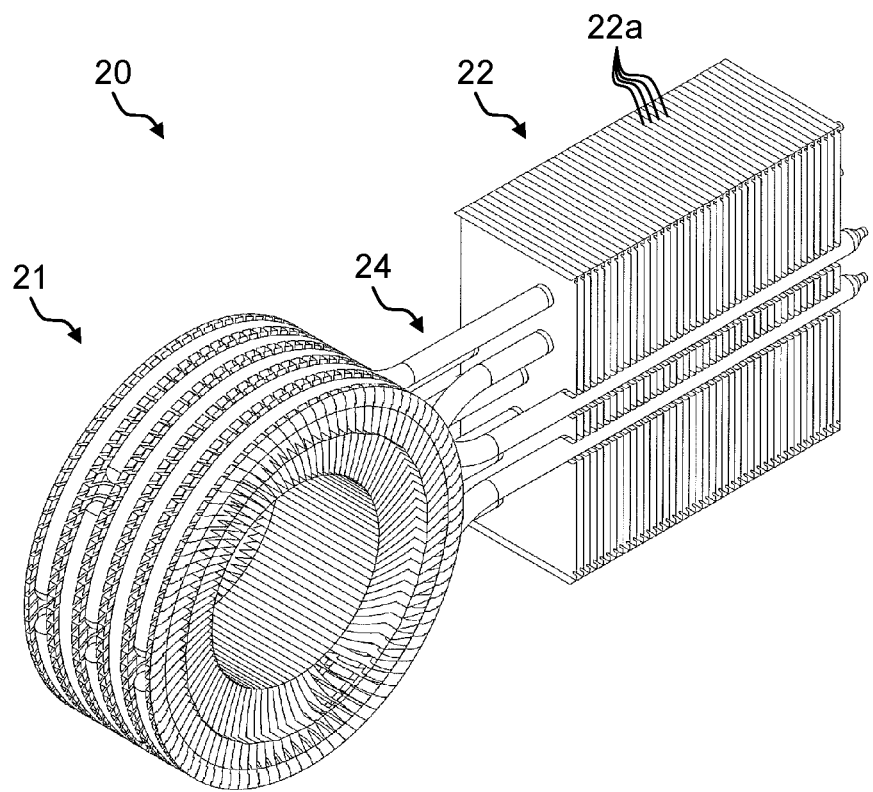
FIG. 4A is a perspective view illustrating the configurations of a heat absorber disposed inside the light conversion device in FIG. 2 and a heat dissipator thermally connected to the heat absorber.
Figure 4B:
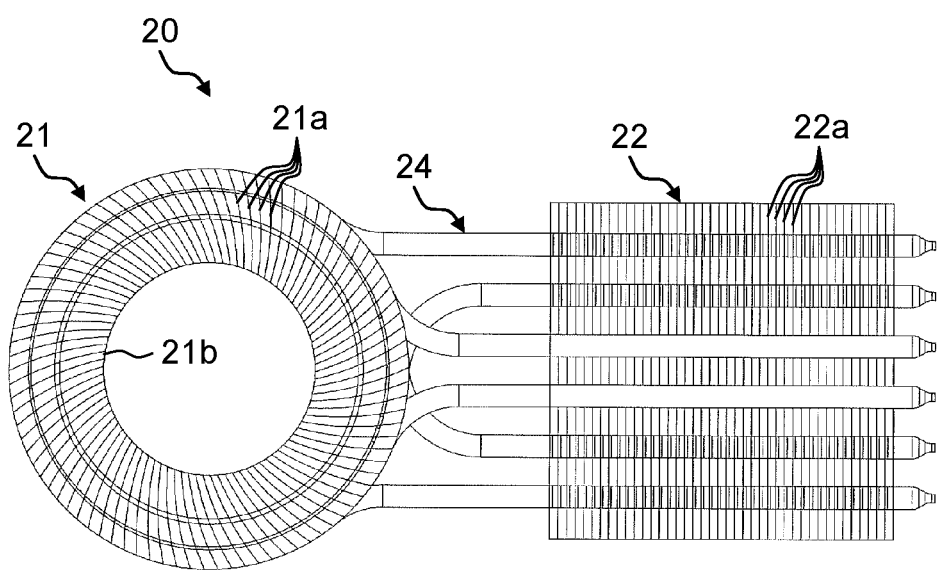
FIG. 4B is a plan view of FIG. 4A.

Heat absorber 21 is disposed inside casing unit 11 of phosphor wheel device 10, as illustrated in FIG. 2. Furthermore, heat absorber 21 includes a fin structure which allows passage of an air flow formed in light conversion device 20 and absorbs heat from an air flow containing heat generated at phosphor layer 13a on phosphor wheel 13. As illustrated in FIG. 3, heat absorber 21 is secured by screws to outer cylindrical portion 11b and bottom portion 11d included in casing unit 11 of phosphor wheel device 10. Furthermore, heat absorber 21 is thermally connected to heat dissipator 22 via heat pipe 24. As illustrated in FIG. 4A and FIG. 4B, heat absorber 21 includes a plurality of fins 21a and a fixed wall (wall portion) 21b. As also illustrated in FIGS. 4A and 4B, the fins 21a are aligned along the circumferential direction of the casing unit 11b and configured so that a surface (the largest surface) of each of the fins 21a extends in a height direction of the cylinder, and extends an entire height of the cylinder-shaped heat absorber 21.

The plurality of fins 21a are configured using a metal having high heat conductivity and are arranged in a spiral form in plan view, as illustrated in FIG. 4B. Thus, an air flow entering a gap between phosphor wheel 13 and lid portion 11a through opening 13c of phosphor wheel 13 can be guided radially outward.

At this time, since phosphor layer 13a is provided on the surface (the first side) of phosphor wheel 13 that faces lid portion 11a, the heat generated at the phosphor can be efficiently released when air blows to and around phosphor layer 13a effectively. In addition, when the air flow passes between the plurality of fins 21a, the heat contained in the air flow moves toward fins 21a, and thus the temperature of the air flow can be reduced.

Fixed wall 21b is part of the inner peripheral surface of heat absorber 21 fixedly disposed on the side of the outer periphery of circulation fan 13b and restricts the air flow created by circulation fan 13b during rotation of phosphor wheel 13 from flowing radially from the center of the rotation.

Accordingly, the air flow created by circulation fan 13b can be efficiently guided through opening 13c of phosphor wheel 13 toward the area where phosphor layer 13a is formed.

Heat dissipator 22 is disposed outside casing unit 11 of phosphor wheel device 10, as illustrated in FIG. 2. As illustrated in FIG. 3, etc., heat dissipator 22 is thermally connected to heat absorber 21 via heat pipe 24 and dissipates, to the outside of casing unit 11, the heat of the air flow absorbed by heat absorber 21. Furthermore, heat dissipator 22 includes a fin structure including a plurality of fins 22a disposed on the outer peripheral surface.

The plurality of fins 22a are configured using a metal having high heat conductivity, and are arranged orthogonally relative to the longitudinal direction of heat pipe 24, as illustrated in FIG. 4A and FIG. 4B, and dissipate heat into the air outside of casing unit 11.

Optical lens 23 is attached to the opening part formed in lid portion 11a of casing unit 11, via optical lens holding component 23a, as illustrated in FIG. 2 and FIG. 3. As illustrated in FIG. 1, optical lens 23 allows passage of excitation light for exciting the phosphor in phosphor layer 13a on phosphor wheel 13, collects the fluorescence from the phosphor in phosphor layer 13a, and guides the collected light toward dichroic mirror 3d.

Heat pipe 24 thermally connects heat absorber 21 and heat dissipator 22, as illustrated in FIG. 4A and FIG. 4B. A hollow space is formed inside heat pipe 24. A small amount of water is encapsulated in this hollow space; upon receiving heat on the heat absorber 21 side, the water is evaporated and moves toward heat dissipator 22 as water vapor. The water vapor moved toward heat dissipator 22 is cooled and liquefied at heat dissipator 22, changing into water. Here, the water resulting from cooling on the heat dissipator 22 side returns toward heat absorber 21 by moving through the hollow space by capillary action.

Thus, inside heat pipe 24, a small amount of water is evaporated on the heat absorber 21 side and liquefied on the heat dissipator 22 side, thereby functioning as a cooling medium.

Configuration of Phosphor Wheel Device 10

Phosphor wheel device 10 according to the present exemplary embodiment is for converting, into red light and green light, blue light (excitation light) emitted from blue LD arrays 2a and 2b, and includes casing unit 11, phosphor wheel 13, motor 14, and pressurization fan 15, as illustrated in FIG. 2.

As illustrated in FIG. 2, casing unit 11 forms, in the circular cylindrical inner space (refer to FIG. 3), an enclosed space for housing phosphor wheel 13, circulation fan 13b, motor 14, heat absorber 21, and the like. A circulation path of an air flow created by circulation fan 13b is formed in casing unit 11. Furthermore, as illustrated in FIG. 5, casing unit 11 includes outer cylindrical portion 11b and inner cylindrical portion 11c which are substantially concentrically arranged in the form of double layers and are in communication with each other at both ends along the X-axis and between which the circulation path of the air flow is formed.

Furthermore, at least part of the exposed area, which is exposed to outside air, of casing unit 11 is formed of a metal. Thus, even when the interior of casing unit 11 is warmed by heat generated at the phosphor portion of phosphor layer 13a on phosphor wheel 13 installed in casing unit 11, the heat can be efficiently released outward because casing unit 11 is formed of a metal having high heat conductivity.

Note that the part of casing unit 11 that is formed of a metal is preferably lid portion 11a on the phosphor wheel 13 side, for example.

In other words, an air flow to which heat generated at the phosphor portion of phosphor layer 13a has been transmitted passes by lid portion 11a disposed close to phosphor layer 13a on phosphor wheel 13 before entering heat absorber 21, as illustrated in FIG. 5.

Thus, even when lid portion 11a is heated by the air flow heated by passing by phosphor layer 13a on phosphor wheel 13, the heat of lid portion 11a can be effectively released outward. As a result, compared to the other members included in casing unit 11 (outer cylindrical portion 11b, inner cylindrical portion 11c, and bottom portion 11d), the lid portion 11a can more effectively release the heat of the air flow outward.

As illustrated in FIG. 3, lid portion 11a is a substantially quadrangular plate-shaped member and is mounted so as to cover a surface of casing unit 11 on the side of phosphor layer 13a on phosphor wheel 13. Furthermore, lid portion 11a has opening portion 11aa (refer to FIG. 2) into which optical lens 23 described above fits.

Opening portion 11aa is a through-hole formed in lid portion 11a, in a position opposite phosphor layer 13a on phosphor wheel 13; optical lens 23 which allows passage of the blue laser light and the fluorescence (the red light and the green light) fits into opening portion 11aa using optical lens holding component 23a.

As illustrated in FIG. 5, spiral guide 11ab is provided as recesses and protrusions formed on a surface of lid portion 11a that faces phosphor layer 13a on phosphor wheel 13.

Figure 6A:
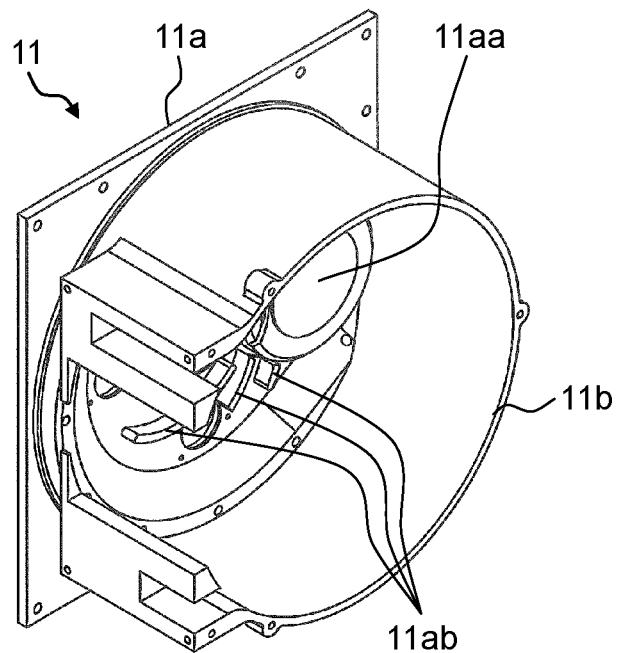
FIG. 6A is a perspective view illustrating a guide formed on the inner surface of a casing unit of the light conversion device in FIG. 2.
Figure 6B:
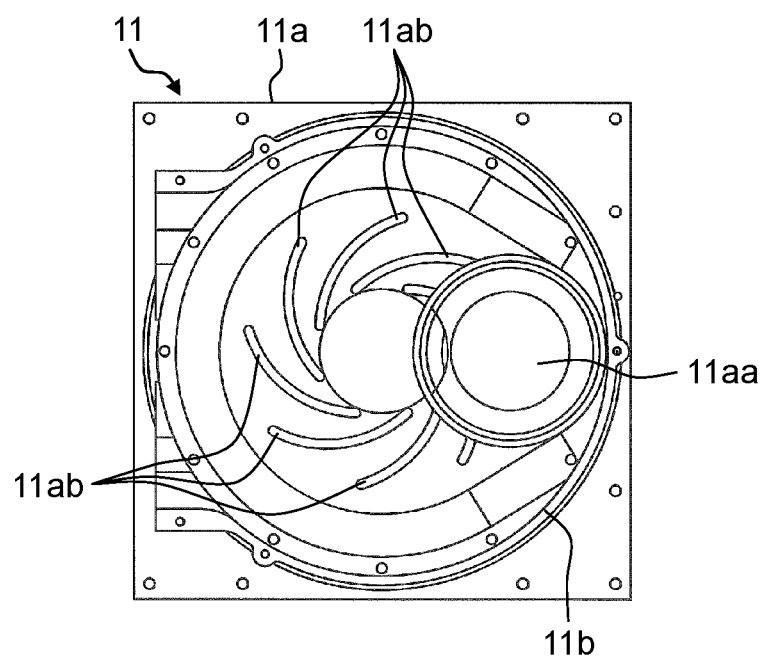
FIG. 6B is a plan view of FIG. 6A.

As illustrated in FIG. 6B, the recesses and protrusions of spiral guide 11ab have the shape of a spiral formed on the same axis as the center of rotation of phosphor wheel 13.

Thus, the air flow created by circulation fan 13b attached to the second side of phosphor wheel 13 can be guided radially outward so as to efficiently blow to and around phosphor layer 13a on phosphor wheel 13.

Outer cylindrical portion 11b is a substantially circular cylindrical member that forms the side surface of casing unit 11, as illustrated in FIG. 3 and FIG. 6A. Furthermore, outer cylindrical portion 11b has an open part in a position on the side on which heat absorber 21 housed in casing unit 11 is connected to heat dissipator 22 provided outside casing unit 11. The open part is closed with a lid to seal casing unit 11.

As illustrated in FIG. 5, inner cylindrical portion 11c is a circular cylindrical member disposed concentrically with outer cylindrical portion 11b and is located on the side of the inner periphery of outer cylindrical portion 11b. Inner cylindrical portion 11c is disposed in a position adjacent to heat absorber 21 on the side of the inner periphery thereof. Furthermore, inner cylindrical portion 11c is formed to be smaller in dimension along the X-axis than outer cylindrical portion 11b, as illustrated in FIG. 5.

Thus, outer cylindrical portion 11b and inner cylindrical portion 11c are in communication with each other at both ends along the X-axis as viewed in a cross-section illustrated in FIG. 5.

Accordingly, the air flow created by circulation fan 13b during rotation of phosphor wheel 13 passes through the communicating part on the phosphor wheel 13 side from the side of the inner periphery of inner cylindrical portion 11c and is guided radially outward by spiral guide 11ab of lid portion 11a while passing by phosphor layer 13a on phosphor wheel 13. Subsequently, the air flow is cooled while moving downward along the X-axis and passing through the interior of heat absorber 21, as illustrated in FIG. 5. The air flow cooled while passing through heat absorber 21 is returned to the side of the inner periphery of inner cylindrical portion 11c through the communicating part on the side opposite phosphor wheel 13.

Bottom portion 11d is mounted so as to cover a surface of casing unit 11 that is on the side opposite lid portion 11a along the X-axis, as illustrated in FIG. 5.

Updraft guide 11e is a guide member for causing the air flow cooled while passing through heat absorber 21 to be turned and move upward, and is provided on a surface of bottom portion 11d, on the side of the inner space of casing unit 11, as illustrated in FIG. 5. Updraft guide 11e has a substantially conical shape centered on the X-axis and upwardly guides, by the force of wind generated by circulation fan 13b and pressurization fan 15, the air flow which has traveled from the side of the outer periphery to the side of the inner periphery.

Figure 7A:
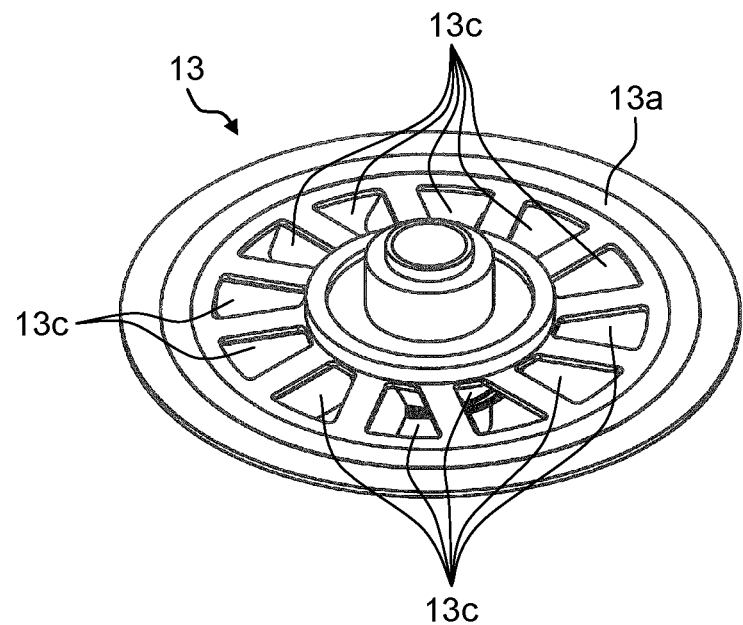
FIG. 7A is a perspective view illustrating a first side of a phosphor wheel of a phosphor wheel device included in the light conversion device in FIG. 2.
Figure 7B:
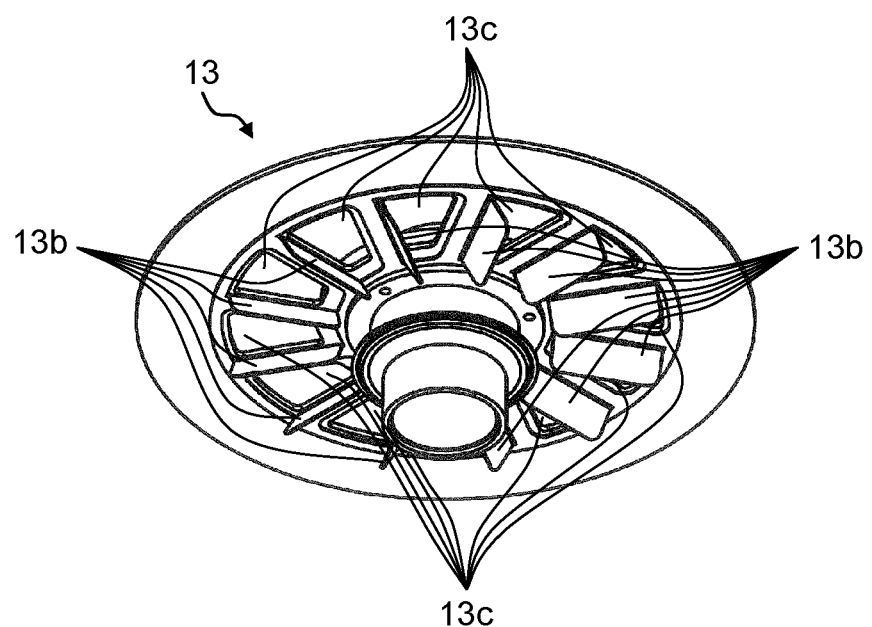
FIG. 7B is a perspective view illustrating a second side of a phosphor wheel in FIG. 7A.

Phosphor wheel 13 is a disc-shaped rotating member which is rotatably driven by motor 14 and includes phosphor layer 13a, circulation fan 13b, and opening 13c, as illustrated in FIG. 7A and FIG. 7B.

Phosphor layer 13a is formed by applying phosphors in the shape of a ring to a surface facing optical lens 23. Phosphor layer 13a converts the blue laser light emitted from blue LD arrays 2a and 2b into red light and green light.

This makes it possible to emit red light and green light from phosphor wheel 13.

Circulation fan 13b forms an air flow for dissipating heat generated when the phosphor in phosphor layer 13a on phosphor wheel 13 is excited in casing unit 11, as illustrated in FIG. 5. Circulation fan 13b is provided on the second side of the phosphor wheel 13 opposite the first side thereof on which phosphor layer 13a is formed, as illustrated in FIG. 7B.

Figure 8A:
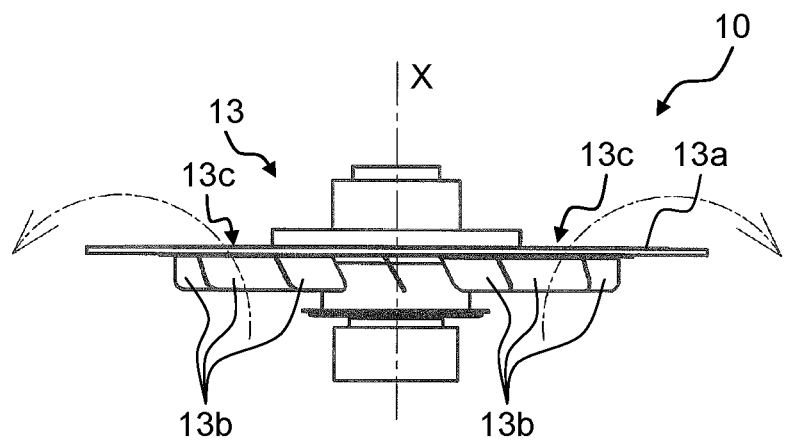
FIG. 8A is a side view illustrating flow directions of an air flow created by rotation of the phosphor wheel illustrated in FIG. 7A, etc.

When phosphor wheel 13 is rotatably driven, circulation fan 13b integrated with phosphor wheel 13 creates an air flow directed upward along the axis, as illustrated in FIG. 8A.

In the present exemplary embodiment, phosphor wheel 13 has opening 13c in a position corresponding to circulation fan 13b. Thus, the air flow created by circulation fan 13b is directed toward phosphor layer 13a on phosphor wheel 13 through opening 13c.

In the enclosed space formed in casing unit 11, the air flow created by circulation fan 13b is heated at and around phosphor layer 13a on phosphor wheel 13 and then passes through heat absorber 21 disposed in the space between outer cylindrical portion 11b and inner cylindrical portion 11c.

At this time, the heated air is cooled by heat exchange with a small amount of water in heat pipe 24 connected to heat absorber 21. Thereafter, the cooled air moves on the side of the inner periphery of inner cylindrical portion 11c and is delivered toward phosphor layer 13a on phosphor wheel 13 through opening 13c.

Thus, it is possible to effectively cool the phosphor in phosphor layer 13a on phosphor wheel 13.

As illustrated in FIG. 7A, a plurality of openings 13c are provided on the side of the inner periphery of phosphor layer 13a in the shape of a ring provided on the first side of phosphor wheel 13. The plurality of openings 13c each have a substantially fan shape and are arranged along the circumference centered on the X-axis. Each of openings 13c is provided in a position corresponding to the attachment position of circulation fan 13b described above.

Figure 8B:
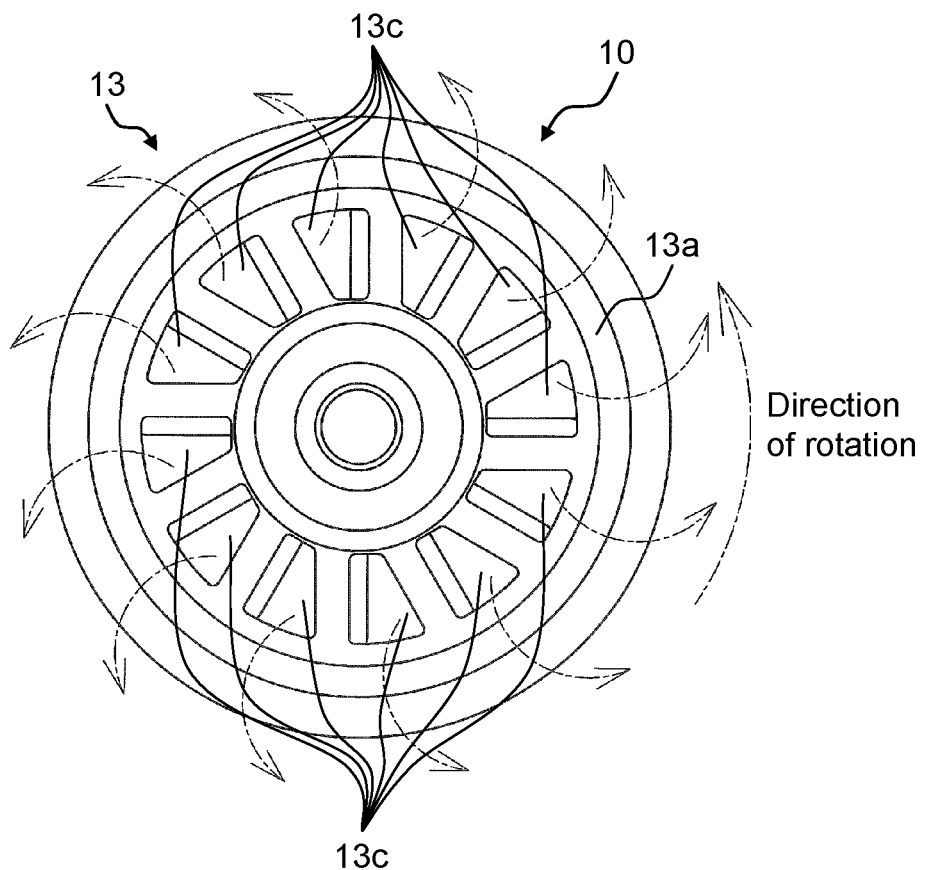
FIG. 8B is a plan view of FIG. 8A.

Thus, as illustrated in FIG. 8A and FIG. 8B, the air flow created by circulation fan 13b passes through opening 13c and is guided toward the first side on which phosphor layer 13a is formed and also moves circumferentially outward by the centrifugal force.

Figure 9:
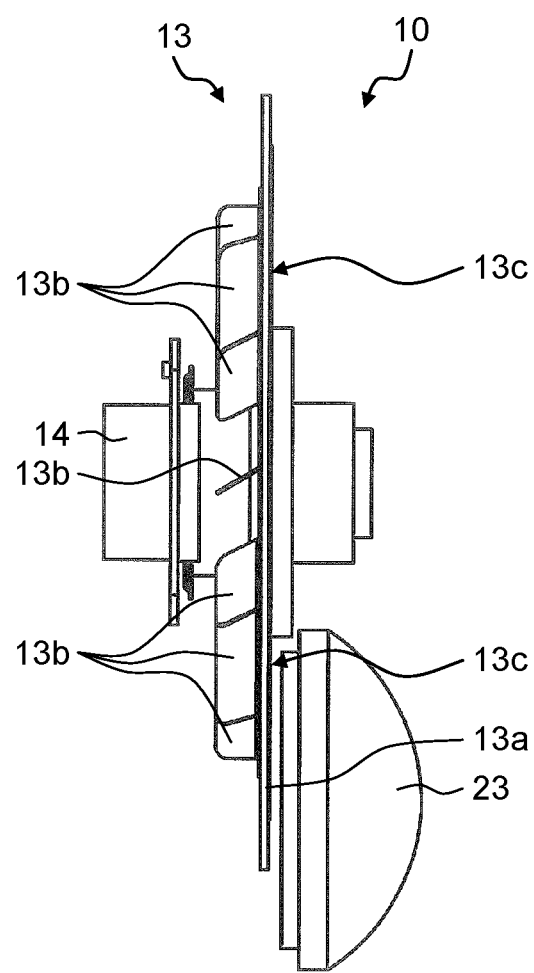
FIG. 9 is a side view illustrating a lens disposed close to a phosphor layer part of the phosphor wheel illustrated in FIG. 7A, etc.

As illustrated in FIG. 9, motor 14 is connected to a rotary shaft of phosphor wheel 13 and rotatably drives phosphor wheel 13 and circulation fan 13b. As illustrated in FIG. 5, motor 14 is disposed in a flow path of the air flow cooled by heat absorber 21.

Thus, even when heat is generated at motor 14 during continuous rotation of phosphor wheel 13, motor 14 can be effectively cooled with cooling air.

Pressurization fan 15 is disposed in the circulation path of the air flow that is formed in casing unit 11 and blows air along a flow direction of the air flow in the circulation path. In other words, pressurization fan 15 is disposed so as to blow air along a flow direction of the air flow created by circulation fan 13b, as illustrated in FIG. 5. Pressurization fan 15 is disposed inside casing unit 11, in a position between phosphor wheel 13 and updraft guide 11e.

Thus, when pressurization fan 15 is disposed at the most downstream location in the circulation path of the air flow created by circulation fan 13b, it is possible to intensify an air flow in a position on the most downstream side where the air flow created by circulation fan 13b has the lowest intensity.

As a result, it is possible to further improve the cooling effect by increasing the flow rate of an air flow around phosphor layer 13a on phosphor wheel 13, motor 14, and the like where heat is generated in casing unit 11.

Circulation of Air Flow created by Circulation Fan 13b

In the present exemplary embodiment, as described above, circulation fan 13b provided on the second side of phosphor wheel 13 mounted in phosphor wheel device 10 creates an air flow in casing unit 11 by rotating integrally with phosphor wheel 13 during rotation thereof.

Specifically, as illustrated in FIG. 5, the air flow crated by circulation fan 13b is formed upward as viewed in the drawing and passes through opening 13c of phosphor wheel 13.

Note that the air flow created by circulation fan 13b is oriented to move radially outward by the centrifugal force, etc., but fixed wall 21b of heat absorber 21 disposed radially outwardly close to circulation fan 13b inhibits the radially outward movement. Thus, it is possible to efficiently guide the air flow to opening 13c by inhibiting the movement of air flowing radially outward of circulation fan 13b.

Next, the air flow that has passed through opening 13c of phosphor wheel 13 is directed outward of a radius centered on the rotary shaft by the centrifugal force and spiral guide 11ab formed on the inner surface of lid portion 11a of casing unit 11.

At this time, the air flow moving along phosphor layer 13a on phosphor wheel 13 is heated by the heat of the phosphor upon passing by the surface of phosphor layer 13a.

Next, the air flow heated by the phosphor moves downward as viewed in FIG. 5 by the inner surface of lid portion 11a and passes through the gap between fins 21a of heat absorber 21.

At this time, heat absorber 21 cools the heated air flow by absorbing the heat thereof.

Next, the air flow cooled by heat absorber 21 moves along a surface of bottom portion 11d from a lower end portion of heat absorber 21 as viewed along the X-axis and is guided toward phosphor wheel 13 by updraft guide 11e.

At this time, as illustrated in FIG. 5, the air flow moved upward by updraft guide 11e travels at an increased flow rate due to pressurization fan 15.

Next, the air flow traveling at the increased flow rate due to pressurization fan 15 moves around motor 14 to cool motor 14 and then returns to circulation fan 13b.

Thus, using the air flow created by circulation fan 13b, it is possible to effectively release the heat generated by the phosphor in phosphor layer 13a on phosphor wheel 13.

In order to effectively release the heat generated at phosphor layer 13a on phosphor wheel 13, a fan is typically provided in such a position that air blows directly from the front of phosphor layer 13a. With such a configuration, however, depending on the position of the fan, there may be no space left for optical lens 23 which is to be disposed close to phosphor layer 13a on phosphor wheel 13, as illustrated in FIG. 9, or the size of the device may increase.

In phosphor wheel device 10 and light conversion device 20 including phosphor wheel device 10 according to the present exemplary embodiment, circulation fan 13b for forming an air flow for cooling phosphor layer 13a on phosphor wheel 13 is provided on a side of phosphor wheel 13 opposite phosphor layer 13a as described above. Furthermore, in the present exemplary embodiment, phosphor wheel 13 has opening 13c in a position corresponding to circulation fan 13b in order to guide the air flow created by circulation fan 13b toward phosphor layer 13a.

Thus, it is possible to leave a space for providing optical lens 23 on the side of phosphor layer 13a on phosphor wheel 13, and an air flow passing by phosphor layer 13a can be formed by circulation fan 13b provided on the second side of phosphor wheel 13 opposite the phosphor layer 13a.

As a result, it is possible to provide both circulation fan 13b and optical lens 23 without increasing the size of the device, and it is also possible to effectively release the heat generated at the phosphor in phosphor layer 13a.

Other Exemplary Embodiments

One exemplary embodiment of the present disclosure has been described above, but the present disclosure is not limited to the above exemplary embodiment; various changes can be made within a scope that does not depart from the essence of the present disclosure.

(A)

The above exemplary embodiment describes an example in which pressurization fan 15 is provided in a space below phosphor wheel 13, as illustrated in FIG. 5, etc., in order to allow the air flow created by circulation fan 13b to be efficiently circulated in casing unit 11. The present disclosure, however, is not limited to this example.

Figure 10:
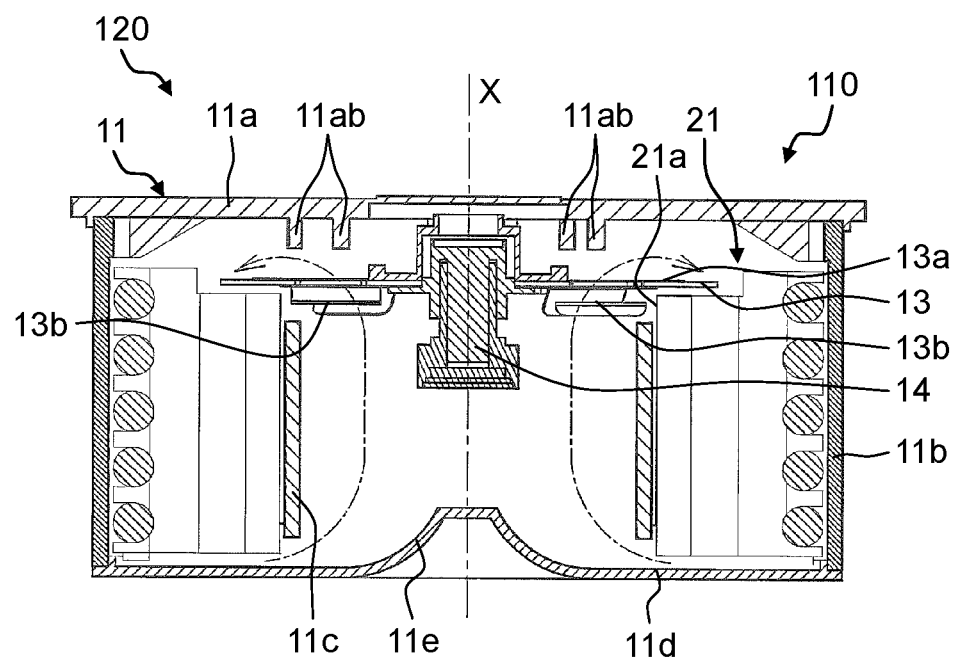
FIG. 10 is a cross-sectional view illustrating the inner configuration of a light conversion device according to another exemplary embodiment of the present disclosure.

For example, as illustrated in FIG. 10, phosphor wheel device 110 and light conversion device 120 which include no pressurization fan inside casing unit 11 are acceptable.

In this case, the air flow created by circulation fan 13b provided on the side of phosphor wheel 13 opposite phosphor layer 13a may be used at heat absorber 21 to cool air containing the heat generated at phosphor layer 13a.

There are, however, cases in which the force of wind generated by circulation fan 13b, alone, is insufficient to efficiently circulate the air flow passing through heat absorber 21. Therefore, for example, in the case of a heat absorber including a fin structure with causes significant pressure loss, pressurization fan 15 for blowing air in the same direction as the air flow created by circulation fan 13b is preferably provided as in the exemplary embodiment described above.

(B)

The above exemplary embodiment describes an example in which updraft guide 11e for moving an air flow upward is provided in a space below phosphor wheel 13 inside casing unit 11, on the top surface of bottom portion 11d, as illustrated in FIG. 5, etc. The present disclosure, however, is not limited to this example.

Figure 11:
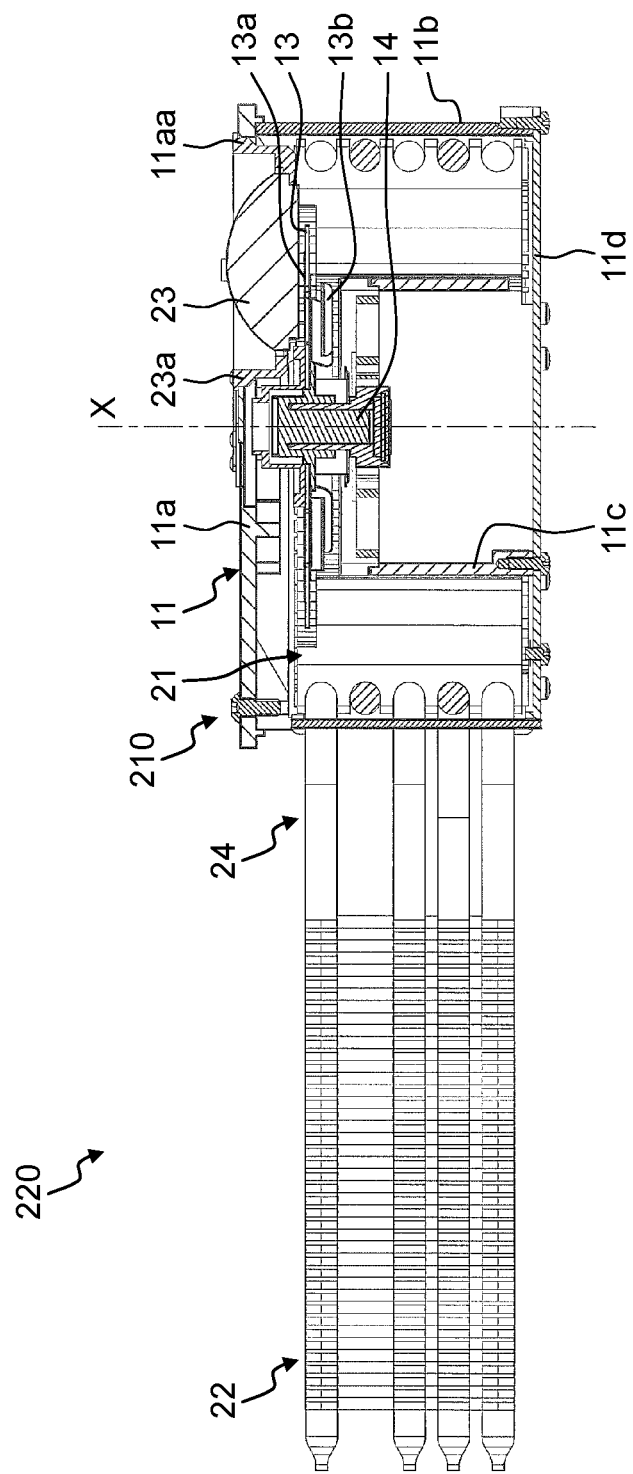
FIG. 11 is a cross-sectional view illustrating the inner configuration of a light conversion device according to yet another exemplary embodiment of the present disclosure.

For example, as illustrated in FIG. 11, phosphor wheel device 210 and light conversion device 220 which include no updraft guide 11e are acceptable.

In this case, since force for moving upward the air flow that has passed through heat absorber 21 depends on only the force of wind generated by circulation fan 13b, it may be difficult to sufficiently circulate the air flow.

Therefore, pressurization fan 15 for blowing air in the same direction as the air flow created by circulation fan 13b may be provided as in the exemplary embodiment described above. This makes it possible to sufficiently circulate the air flow inside casing unit 11 even in the configuration in which no updraft guide is included.

(C)

The above exemplary embodiment describes an example in which the heat generated at phosphor layer 13a on phosphor wheel 13 is absorbed by heat absorber 21 using air as a medium and then is dissipated out through heat dissipator 22 thermally connected to heat absorber 21 via heat pipe 24, as illustrated in FIG. 2, etc. The present disclosure, however, is not limited to this example.

Figure 12A:
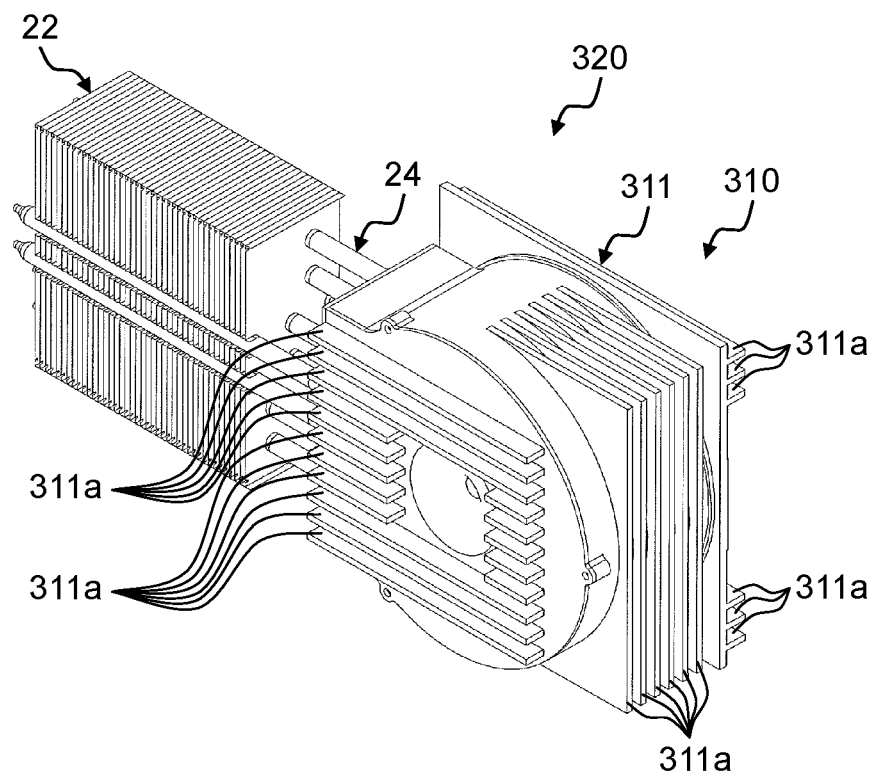
FIG. 12A is a perspective view illustrating a light conversion device according to yet another exemplary embodiment of the present disclosure.
Figure 12B:
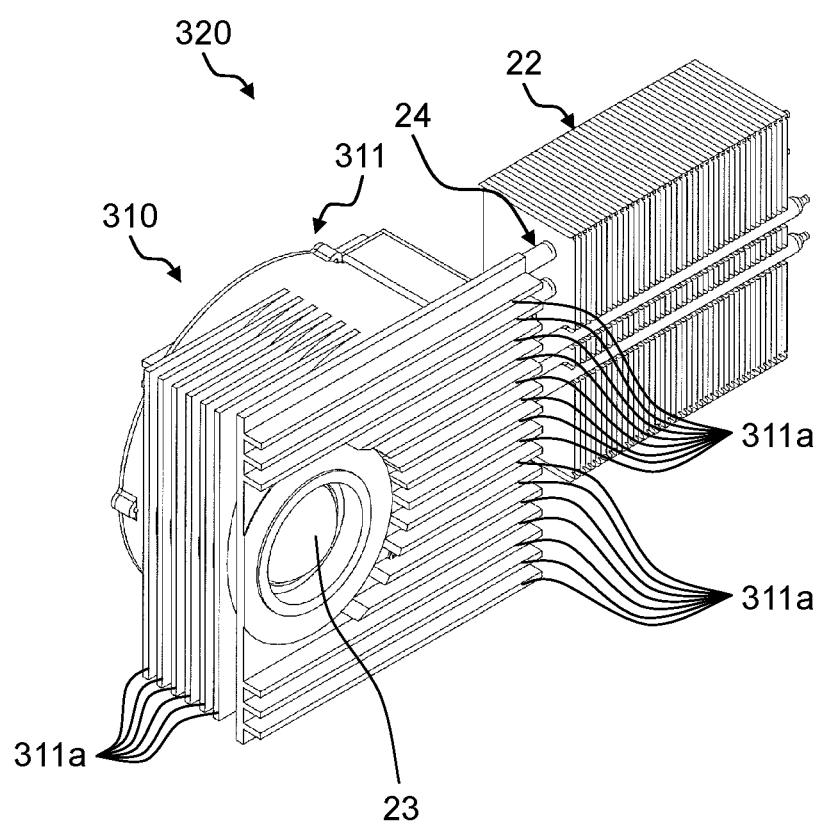
FIG. 12B is a perspective view of the light conversion device in FIG. 12A as seen from the opposite side.

For example, as illustrated in FIG. 12A and FIG. 12B, outer wall fin 311a may be provided on an outer surface of casing unit 311 which encloses phosphor wheel device 310 and light conversion device 320 so that the heat generated at the phosphor layer on the phosphor wheel is dissipated through outer wall fin 311a.

In this configuration, the function of releasing heat through outer wall fin 311a of casing unit 311 can be provided in addition to the heat dissipation function of heat dissipator 22, and thus it is possible to more efficiently dissipate out the heat generated at a phosphor layer part.

(D)

The above exemplary embodiment describes an example in which the inner peripheral surface of heat absorber 21 is used as fixed wall 21b in order to inhibit the air flow created by circulation fan 13b provided on phosphor wheel 13 from being delivered radially outward, as illustrated in FIG. 5, etc. The present disclosure, however, is not limited to this example.

Figure 13:
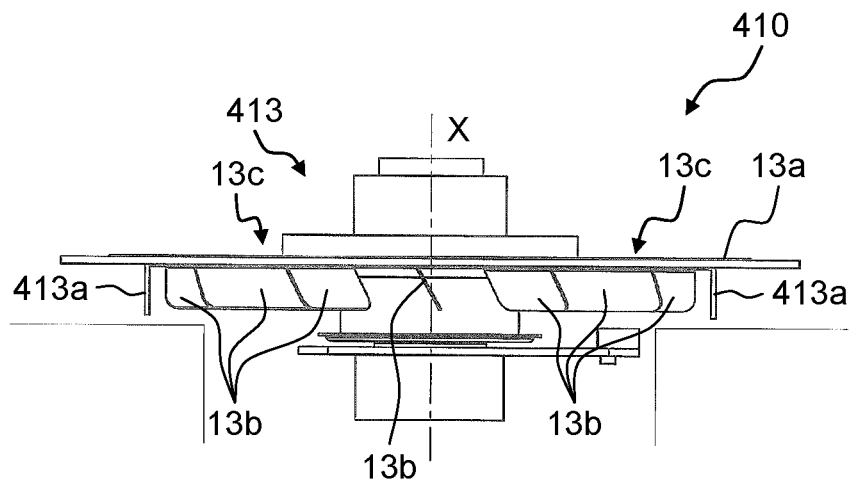
FIG. 13 is a side view illustrating the inner configuration of a light conversion device according to yet another exemplary embodiment of the present disclosure.

For example, phosphor wheel device 410 is acceptable which includes, instead of fixed wall 21b, rotating wall 413a in the shape of a ring on the side of phosphor wheel 413 on which circulation fan 13b is provided, as illustrated in FIG. 13.

In this phosphor wheel device 410, rotating wall 413a which rotates integrally with phosphor wheel 413 allows the air flow created by circulation fan 13b to be inhibited from moving radially outward, and thus the air flow can be efficiently guided toward phosphor layer 13a through opening 13c.

(E)

The above exemplary embodiment describes an example in which the heat generated at phosphor layer 13a on phosphor wheel 13 is dissipated out by using heat absorber 21 and heat dissipator 22 thermally connected via heat pipe 24. The present disclosure, however, is not limited to this example.

Figure 14:
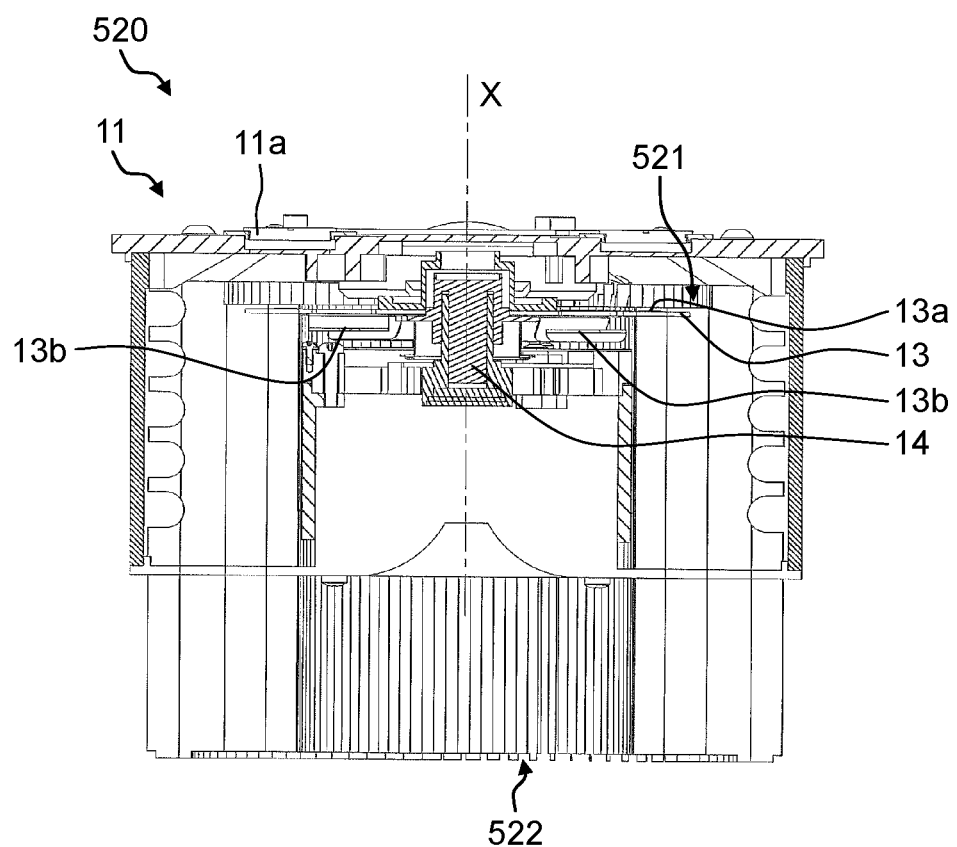
FIG. 14 is a cross-sectional view illustrating the inner configuration of a light conversion device according to yet another exemplary embodiment of the present disclosure.

For example, light conversion device 520 is acceptable in which heat absorber 521 and heat dissipator 522 are directly connected and which is configured to include no heat pipe, as illustrated in FIG. 14.

Even in this case, heat absorber 521 and heat dissipator 522 are thermally connected through a partition wall of casing unit 11, and thus the heat generated at phosphor layer 13a on phosphor wheel 13 can be circulated inside casing unit 11 by circulation fan 13b and thereby dissipated out through heat absorber 521 and heat dissipator 522.

(F)

The above exemplary embodiment describes an example in which heat absorber 21 includes a fin structure including the plurality of fins 21a arranged in a spiral form, as illustrated in FIG. 4B. The present disclosure, however, is not limited to this example.

Figure 15:
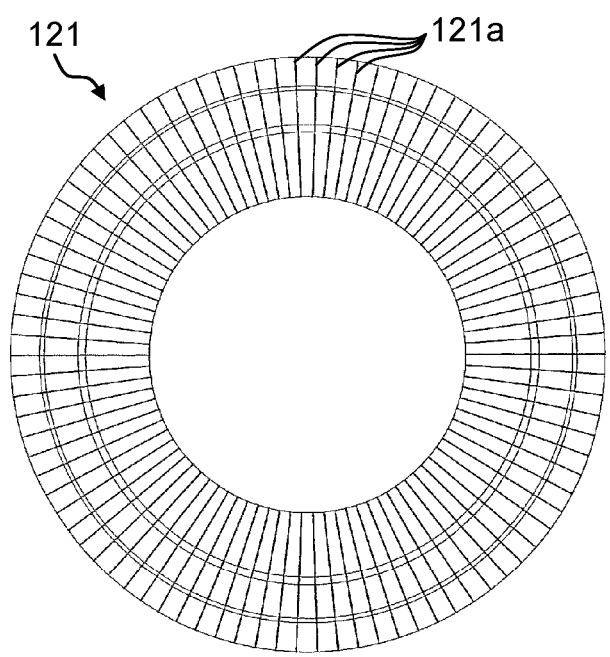
FIG. 15 is a plan view illustrating the configuration of a heat absorber included in a light conversion device according to yet another exemplary embodiment of the present disclosure.

For example, heat absorber 121 may be used which includes a fin structure including a plurality of fins 121a radially arranged, as illustrated in FIG. 15.

Even in this case, efficient cooling is possible by causing the air flow created by circulation fan 13b attached to phosphor wheel 13 to pass through the fin structure of heat absorber 121.

(G)

The above exemplary embodiment describes an example in which phosphor wheel device 10 and light conversion device 20 according to the present disclosure are mounted in three-chip DLP projector 100 including three DMDs 7. The present disclosure, however, is not limited to this example.

For example, the phosphor wheel device and the light conversion device according to the present disclosure may be mounted in a one-chip DLP projector in which one DMD and a color wheel are combined.

(H)

The above exemplary embodiment describes an example in which phosphor wheel device 10 and light conversion device 20 according to the present disclosure are mounted in DLP projector 100. The present disclosure, however, is not limited to this example.

For example, the phosphor wheel device and the light conversion device according to the present disclosure may be mounted in a liquid crystal display (LCD) or a liquid crystal projector using liquid crystal on silicon (LCOS).

(I)

The above exemplary embodiment describes projector 100 as an example of a projection display apparatus according to the present disclosure. The present disclosure, however, is not limited to this example.

For example, the configuration according to the present disclosure may be applied to other projection display apparatuses such as rear-projection televisions aside from projectors.

(J)

The above exemplary embodiment describes an example in which, as illustrated in FIG. 6B, spiral guide 11ab for radially outwardly guiding the air flow created by circulation fan 13b is formed on the inner surface of lid portion 11a forming casing unit 11, in a position opposite heat absorber 21. The present disclosure, however, is not limited to this example.

For example, instead of the spiral guide, a radial guide formed of a plurality of recesses and protrusions radially arranged may be provided as a guide portion for radially outwardly guiding the air flow created by circulation fan 13b.

Even in this case, it is possible to supply cooling air to and around the phosphor layer on the phosphor wheel by radially outwardly guiding the air flow created by the circulation fan as in the exemplary embodiment described above.

INDUSTRIAL APPLICABILITY

The light conversion device according to the present disclosure can be widely applied as a light conversion device mounted in a projection display apparatus or the like because the light conversion device according to the present disclosure produces the advantageous effect of achieving flexibility in positioning of a light source optical system such as a lens while enabling an increase in the conversion efficiency by efficiently releasing the heat generated at the phosphor portion.

What is claimed is:

1. A light conversion device comprising:
  a phosphor wheel having a first side on which a phosphor layer in the shape of a ring is formed, the phosphor wheel being in the shape of a disc with an opening provided on a side of an inner periphery of the phosphor layer;
  a circulation fan which blows an air flow to the phosphor layer on the phosphor wheel;
  a motor which rotatably drives the phosphor wheel;
  a casing unit which houses the phosphor wheel, the circulation fan and the motor, and in which a circulation path of the air flow created by the circulation fan is formed, the casing unit including an outer cylindrical portion and an inner cylindrical portion disposed within the outer cylindrical portion; and
  a heat absorber including a fin structure including a plurality of fins aligned along a circumferential direction of the casing unit and configured so that a largest surface of each of the plurality of fins extends in a height direction of the cylinder, the fin structure being located in a space between the outer cylindrical portion and the inner cylindrical portion,
  wherein the circulation fan, the casing unit, and the heat absorber are configured to (i) cause air to pass through the heat absorber disposed in the space between the outer cylindrical portion and the inner cylindrical portion, and to (ii) cause the air to subsequently pass through an inside of the inner cylindrical portion, and
  wherein the circulation fan, the casing unit, and the heat absorber are configured to cause higher-temperature air to pass through the heat absorber disposed in the space between the outer cylindrical portion and the inner cylindrical portion and thereby change the higher-temperature air into lower-temperature air, and subsequently re-direct the lower-temperature air toward the phosphor wheel from inside of the inner cylindrical portion to cool the phosphor layer.

2. The light conversion device according to claim 1, wherein
  the phosphor wheel has a plurality of openings arranged circumferentially on the side of the inner periphery of the phosphor layer in the shape of the ring.

3. The light conversion device according to claim 1, wherein
  the opening is located radially inward of the heat absorber in the shape of the cylinder.

4. The light conversion device according to claim 1, wherein
  the circulation fan is attached to a second side of the phosphor wheel and blows the air flow toward the phosphor layer on the phosphor wheel through the opening, the second side being opposite the first side on which the phosphor layer is provided.

5. The light conversion device according to claim 1, wherein
  the inner cylindrical portion is disposed substantially concentrically within the outer cylindrical portion.

6. The light conversion device according to claim 1, wherein
  the motor is disposed in a flow path of the air flow cooled by the heat absorber.

7. The light conversion device according to claim 1, wherein
  the casing unit includes, in a position opposite the fin structure of the heat absorber, a guide portion which is formed along the radial direction and guides, outward in the radial direction, the air flow created by the circulation fan.

8. The light conversion device according to claim 1, wherein
  each of the plurality of fins extends a distance of an entire height of the cylinder.

9. The light conversion device according to claim 1, further comprising
  a pressurization fan which is disposed in the circulation path and blows air along a flow direction of the air flow in the circulation path.

10. The light conversion device according to claim 1, wherein
  at least part of an exposed area of the casing unit is formed of a metal, the exposed area being exposed to outside air.

11. The light conversion device according to claim 1, wherein
  the casing unit includes a fin structure formed on at least part of an outer surface of the casing unit.

12. The light conversion device according to claim 1, further comprising
  a heat pipe connecting the heat absorber and a heat dissipator.

13. The light conversion device according to claim 1, wherein
the heat absorber and a heat dissipator are integrally structured and thermally connected through a partition wall of the casing unit.

14. The light conversion device according to claim 1, further comprising
a wall portion in the shape of a ring which is provided on a side of an outer periphery of the circulation fan and restricts the air flow incoming from the circulation fan from flowing radially from a center of rotation of the circulation fan.

15. The light conversion device according to claim 14, wherein
the wall portion is fixedly disposed on the side of the outer periphery of the circulation fan.

16. The light conversion device according to claim 14, wherein
the wall portion is connected to one of the phosphor wheel and the circulation fan and rotates integrally with the one of the phosphor wheel and the circulation fan.

17. A projection display apparatus comprising:
the light conversion device according to claim 1;
a light source which emits light that excites a phosphor in the phosphor layer;
a light valve which forms a projection image using light emitted from the light source; and
an optical component which optically connects the light source, the light conversion device, and the light valve.

18. The light conversion device according to claim 1, wherein
the opening of the phosphor wheel is located radially inward of the inner cylindrical portion.

19. The light conversion device according to claim 18, wherein
the circulation fan, the casing unit, and the heat absorber are configured to cause air from the inside of the inner cylindrical portion to pass through the opening of the phosphor wheel.

20. The light conversion device according to claim 1, wherein
the circulation fan, the casing unit, and the heat absorber are configured to cause air from the inside of the inner cylindrical portion to pass through the opening of the phosphor wheel.

\* \* \* \* \*